(12) United States Patent
Pai et al.

(10) Patent No.: US 11,173,639 B2
(45) Date of Patent: *Nov. 16, 2021

(54) FORMING MOLD FOR MAKING POLYVINYL CHLORIDE FOAMED WOOD-LIKE SLATS

(71) Applicant: UNION WINNER INTERNATIONAL CO., LTD., Taipei (TW)

(72) Inventors: Ming-Tsung Pai, Caotun Township (TW); Kun-Chuan Wu, Kaohsiung (TW)

(73) Assignee: UNION WINNER INTERNATIONAL CO., LTD., Taipei (TW)

( * ) Notice: Subject to any disclaimer, the term of this patent is extended or adjusted under 35 U.S.C. 154(b) by 111 days.

This patent is subject to a terminal disclaimer.

(21) Appl. No.: 16/728,777

(22) Filed: Dec. 27, 2019

(65) Prior Publication Data
US 2021/0170645 A1 Jun. 10, 2021

(30) Foreign Application Priority Data
Dec. 10, 2019 (TW) .................................. 108145153

(51) Int. Cl.
*B29C 48/345* (2019.01)
*B29C 48/07* (2019.01)
(Continued)

(52) U.S. Cl.
CPC .............. *B29C 44/58* (2013.01); *B29C 48/07* (2019.02); *B29C 48/21* (2019.02); *B29C 48/305* (2019.02);
(Continued)

(58) Field of Classification Search
CPC ..... B29C 48/07; B29C 48/21; B29C 48/2566; B29C 48/305; B29C 48/307; B29C 48/345; B29C 48/495
See application file for complete search history.

(56) References Cited

U.S. PATENT DOCUMENTS

| 3,381,336 A * | 5/1968 | Wells ...................... B29C 48/05 |
| | | 425/378.2 |
| 3,416,190 A * | 12/1968 | Mehnert .................. B29C 48/71 |
| | | 425/192 R |

(Continued)

*Primary Examiner* — Xiao S Zhao
*Assistant Examiner* — Joseph S Leyson
(74) *Attorney, Agent, or Firm* — Birch, Stewart, Kolasch & Birch, LLP

(57) ABSTRACT

A forming mold for making polyvinyl chloride foamed wood-like slats includes an inlet, an outlet, and two main flow passages symmetrically arranged with respect to a central axis. The main flow passages each have an inlet section and an outlet section. The inlet section of each main flow passage is connected to the inlet. The extension direction of the inlet section of each main flow passage respectively defines with the central axis an included angle therebetween. The sum of the angles of the two first included angles ranges from 45 to 52 degrees. The longitudinal cross-sectional width of each main flow passage gradually decreases from the inlet toward the outlets. In this way, the forming mold of the present invention can effectively improve production efficiency and can increase the stability of the product manufacturing process.

10 Claims, 7 Drawing Sheets

(51) Int. Cl.
*B29C 48/21* (2019.01)
*B29C 48/305* (2019.01)
*B29C 48/495* (2019.01)
*B29C 44/58* (2006.01)
*B29K 105/04* (2006.01)
*B29K 27/06* (2006.01)

(52) U.S. Cl.
CPC .......... *B29C 48/307* (2019.02); *B29C 48/345* (2019.02); *B29C 48/495* (2019.02); *B29K 2027/06* (2013.01); *B29K 2105/04* (2013.01)

(56) References Cited

U.S. PATENT DOCUMENTS

| | | | | |
|---|---|---|---|---|
| 3,561,053 | A * | 2/1971 | Pearson | ................... B29C 48/09 425/192 R |
| 4,395,217 | A * | 7/1983 | Benadi | ................... B29C 48/695 425/382 R |
| 6,263,918 | B1 * | 7/2001 | Lewis | ........................ F15D 1/02 137/561 A |
| 6,793,474 | B2 * | 9/2004 | Groeblacher | ........... B29C 48/09 425/131.1 |
| 7,270,711 | B2 * | 9/2007 | DeMent | ................... B29C 41/04 118/300 |

\* cited by examiner

FORMING MOLD FOR MAKING POLYVINYL CHLORIDE FOAMED WOOD-LIKE SLATS

BACKGROUND OF THE INVENTION

1. Field of the Invention

The present invention relates to slat forming technology and more particularly, to a forming mold for making polyvinyl chloride foamed wood-like slats.

2. Description of the Related Art

In the past, curtain slats were mainly made of aluminum or iron flakes after being processed into curved sections, and then painted on the surface. However, such traditional slats have the disadvantages of high raw material costs, heavy weight of the finished product, and easy absorption of heat, resulting in poor thermal insulation effects. In order to improve the above problems, some developers have developed slats made of plastic raw materials such as polyvinyl chloride foam materials to achieve the goals of cost reduction, light weight, and good thermal insulation. However, the forming molds currently used for making PVC foamed slats mainly use a one-in-one-out design, that is, there is only one inlet and one outlet, which will cause the problem of low production efficiency.

SUMMARY OF THE INVENTION

The present invention has been accomplished under the circumstances in view. It is the main object of the present invention to provide a forming mold for making polyvinyl chloride foamed wood-like slats, which can effectively improve production efficiency.

To achieve this and other objects of the present invention, a forming mold for making polyvinyl chloride foamed wood-like slats comprises an inlet, an outlet, and two main flow passages symmetrically arranged with respect to a central axis. The main flow passages each have an inlet section and an outlet section. The inlet section of each main flow passage is connected to the inlet. The extension direction of the inlet section of each main flow passage respectively defines with the central axis an included angle therebetween. The sum of the angles of the two first included angles ranges from 45 to 52 degrees. The longitudinal cross-sectional width of each main flow passage gradually decreases from the inlet toward the outlets.

As can be known from the above, the forming mold of the present invention uses a one-in two-out design and is matched with the symmetrical configuration of the two main flow passages to effectively improve production efficiency and to make the manufactured product have the characteristics of stable quality.

Preferably, two main flow passages each comprise a front connection section connected to the associating inlet section, a rear connection section connected to the associating outlet section, and a middle connection section connected between the front connection section and the rear connection section. The cross section width of the front connection section of each main flow passages remain the same from beginning to end. The extension direction of each front connection section respectively defines with the central axis a second included angle therebetween, and the sum of the angles of the two second included angles ranges from 37 to 52 degrees. The cross section width of the middle connection section of each main flow passage gradually increases from the associating front connection section to the associating rear connection section. A third included angle is respectively defined between the extension direction of the inner wall of each of the two middle connection sections and the central axis, and the sum of the angles of the two third included angles ranges from 7 to 12 degrees. A fourth included angle is respectively defined between the extension direction of the outer wall of each of the two middle connection sections and the central axis, and the sum of the angles of the two fourth included angles ranges from 22 to 34 degrees. The cross section width of the rear connection section of each of the two main flow passages gradually increases from the associating middle connection section to the associating outlet section. With the above technical characteristics, after the polyvinyl chloride foam material is injected into the inlet, the polyvinyl chloride foam material can quickly and stably pass through the main flow passages, and then the shape of the product is formed from the outlet.

Preferably, the forming mold further comprises a sub flow passage and two branch flow passages. The sub flow passage is located between the rear connection sections of the two main flow passages and extends straight down from the top surface of the forming mold. The two branch flow passages each have one end thereof respectively communicating with the rear connection sections of the two main flow passages, and an opposite end thereof commonly communicating with the bottom end of the sub flow passage.

With the above technical characteristics, a skin material is injected into the sub flow passage, and then the skin material flows from the sub flow passage through the two branch flow passages to the rear connection sections of the two main flow passages respectively, and the skin material is then mixed with the polyvinyl chloride foam material passing therethrough to form the skin layer of the product.

The detailed structure, characteristics, assembly or use method of the forming mold for making polyvinyl chloride foamed wood-like slats provided by the present invention will be described in the detailed description of the subsequent preferred embodiment. However, those with ordinary skill in the art of the present invention should be able to understand that the detailed descriptions and the specific preferred embodiment listed in the implementation of the present invention are only used to illustrate the present invention and are not intended to limit the scope of the patent application of the present invention.

DETAILED DESCRIPTION OF THE INVENTION

Figure 1:
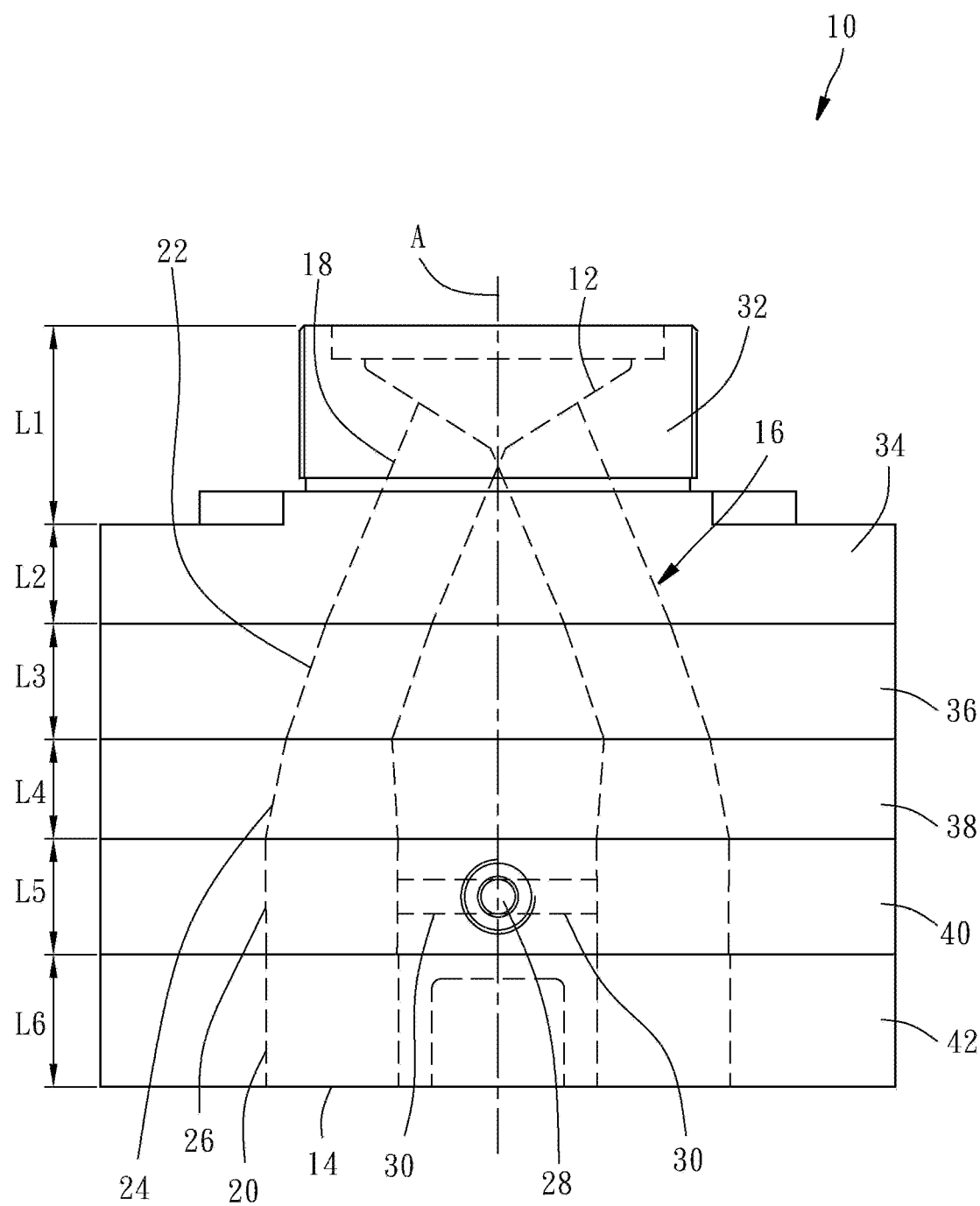
FIG. 1 is a top view of a forming mold for making polyvinyl chloride foamed wood-like slats in accordance with the present invention.

The applicant first describes here, in the entire specification, including the preferred embodiment and the drawings, the terms related to directionality are based on the directions in the drawings. Second, in the embodiment and the drawings to be described below, the same component numbers represent the same or similar components or their structural features.

Figure 2:
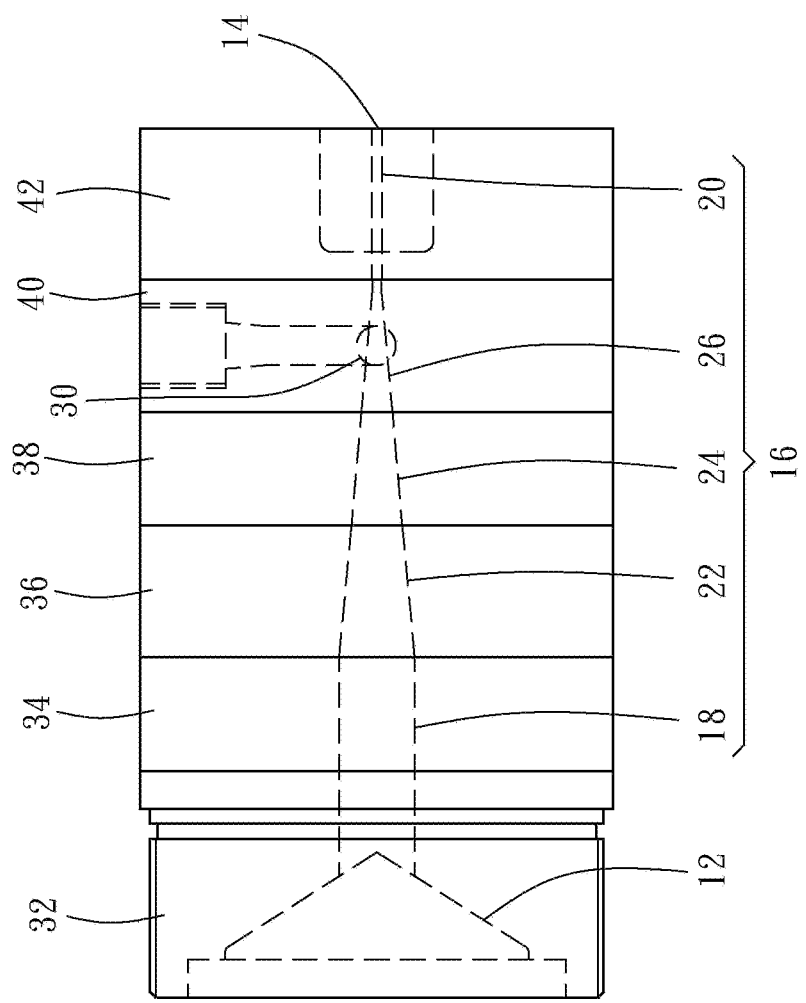
FIG. 2 is a side view of the forming mold for making polyvinyl chloride foamed wood-like slats in accordance with the present invention.

Referring to FIG. 1 and FIG. 2, a forming mold 10 has one inlet 12 and two outlets 14, wherein the inlet 12 has an opening angle α between 105 and 115 degrees. The forming mold 10 of the present invention further has two main flow passages 16, and the two main flow passages 16 are symmetrically arranged with respect to a central axis A, and the longitudinal cross-sectional width of the two main flow passages 16 gradually decreases from the inlet 12 toward the outlets 14 (see FIG. 2). The two main flow passages 16 each have an inlet section 18 and an outlet section 20. The inlet sections 18 of the two main flow passages 16 each have one end thereof commonly connected to the inlet 12. The cross section width of the inlet section 18 of each of the two main flow passages 16 remains the same from beginning to end.

Figure 3:
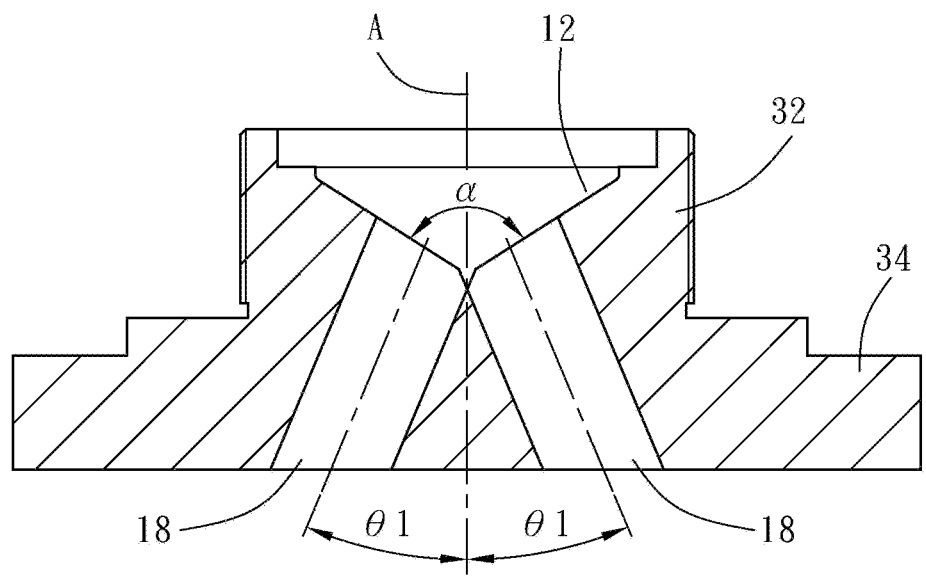
FIG. 3 is a top view of the first die block and the second die block of the forming mold in accordance with the present invention.
Figure 4:
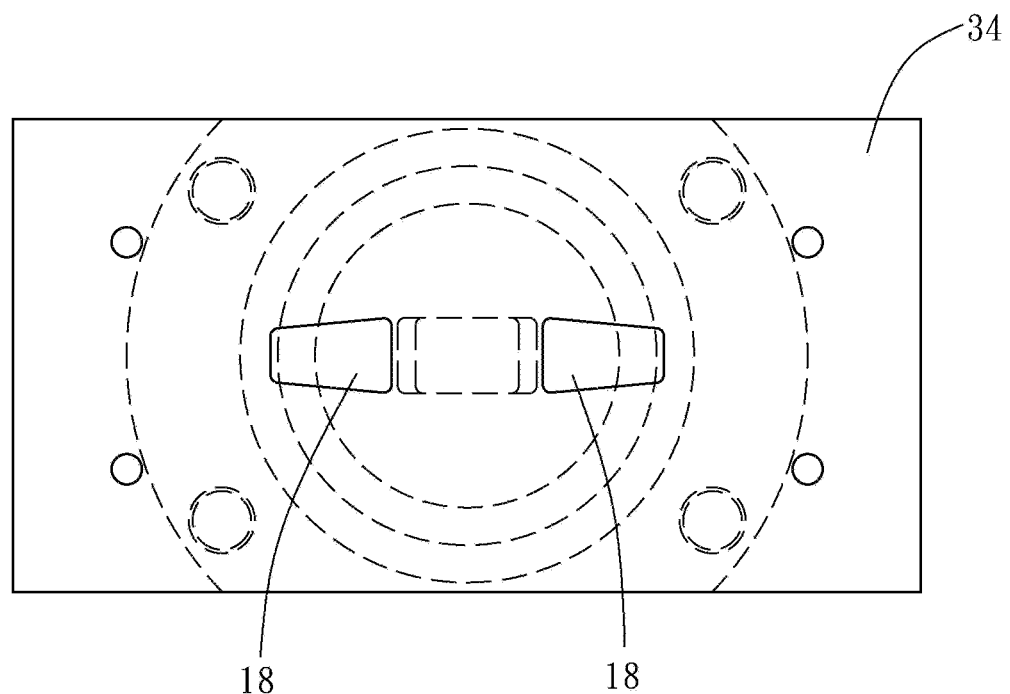
FIG. 4 is an end view of the second die block of the forming mold in accordance with the present invention.
Figure 11:
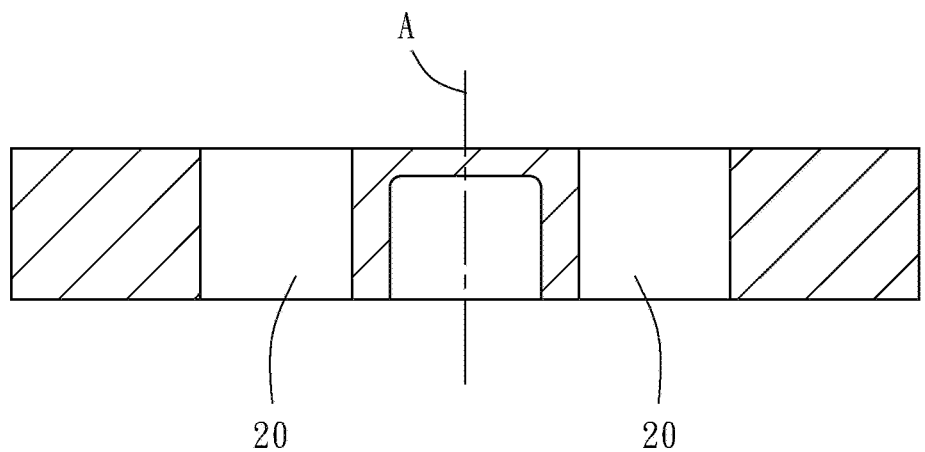
FIG. 11 is a top view of the sixth die block of the forming mold in accordance with the present invention.
Figure 12:
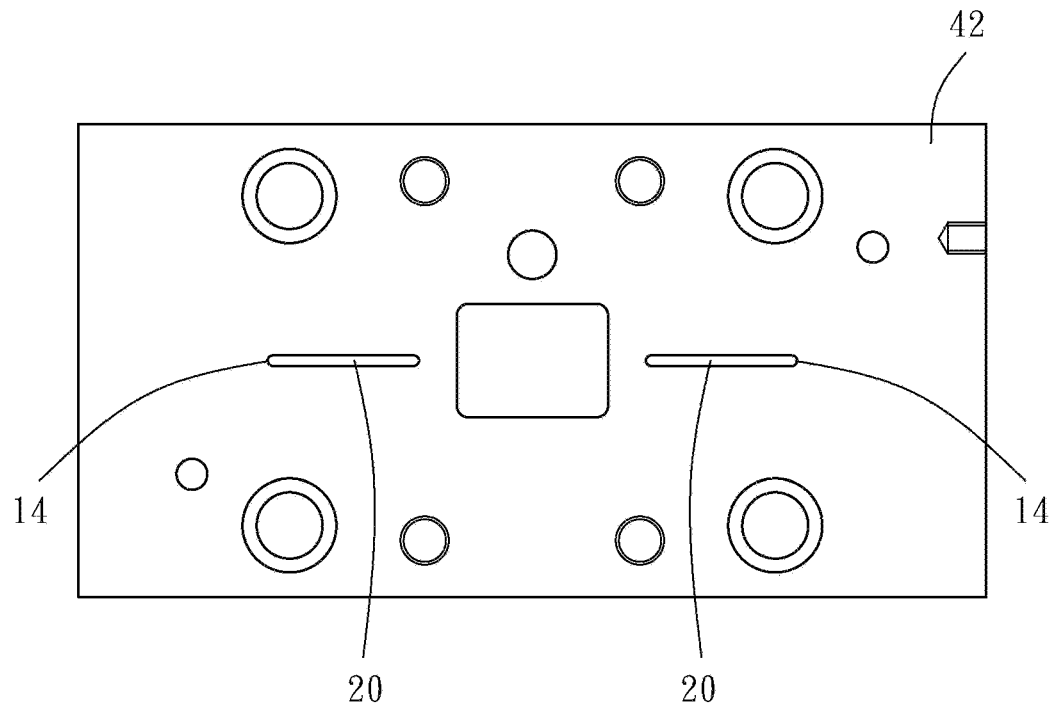
FIG. 12 is an end view of the sixth die block of the forming mold in accordance with the present invention.

Referring to FIG. 3 and FIG. 4, a first included angle θ1 is respectively defined between the extension direction of the inlet section 18 of each of the two main flow passages 16 and the central axis A, and the sum of the angles of the two first included angles θ1 ranges from 45 to 52 degrees (the minimum total is 45.6 degrees, and the maximum total angle is 51.3 degrees). Referring to FIG. 11 and FIG. 12, the outlet section 20 of each of the two main flow passages 16 has one end thereof connected to one respective outlet 14. The cross section width of the outlet section 20 of each of the two main flow passages 16 remains the same from beginning to end. The extending direction of the outlet section 20 of each of the two main flow passages 16 is parallel to the central axis A.

Figure 5:
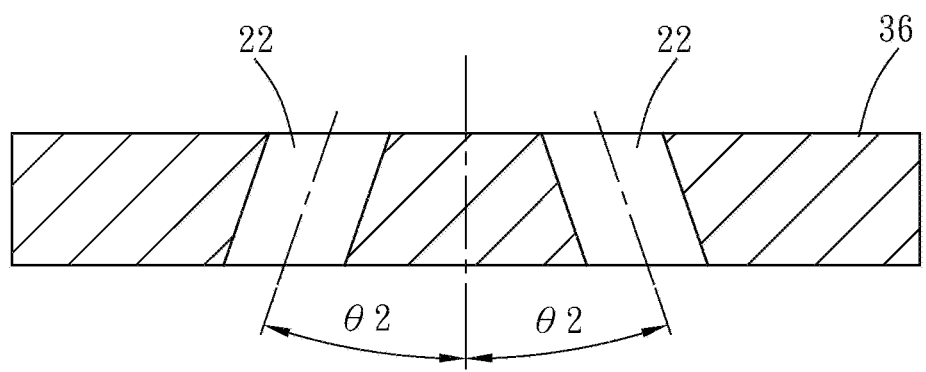
FIG. 5 is a top view of the third die block of the forming mold in accordance with the present invention.
Figure 6:
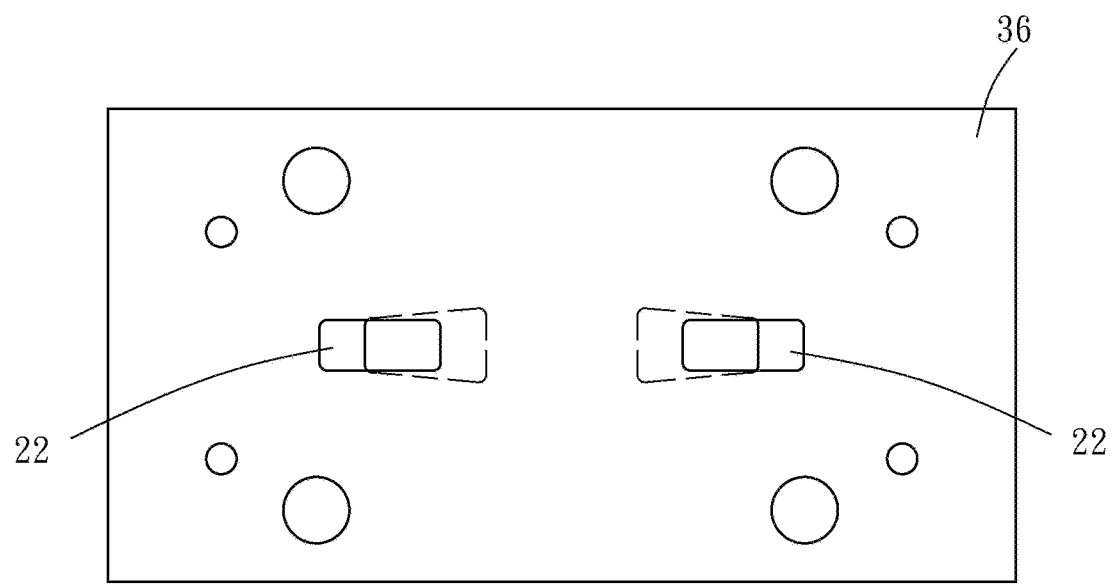
FIG. 6 is an end view of the third die block of the forming mold in accordance with the present invention.
Figure 7:
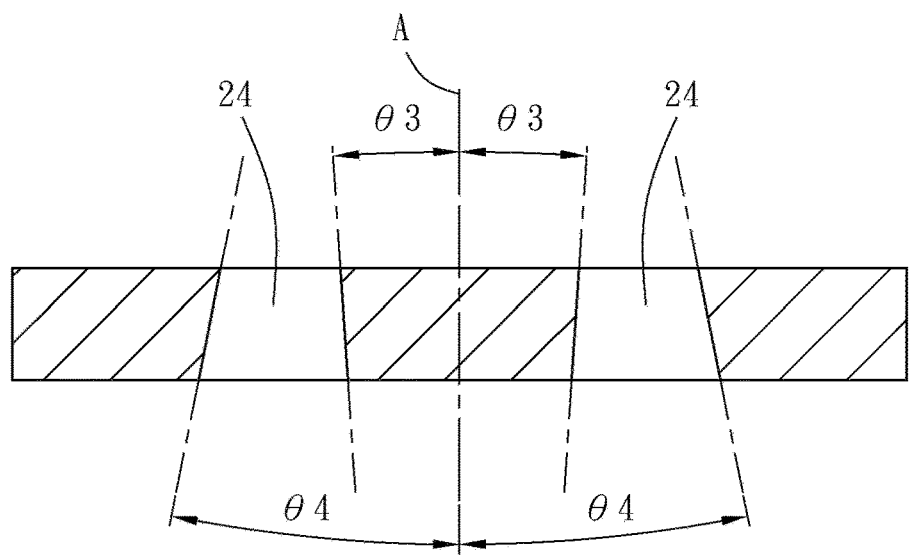
FIG. 7 is a top view of the fourth die block of the forming mold in accordance with the present invention.
Figure 8:
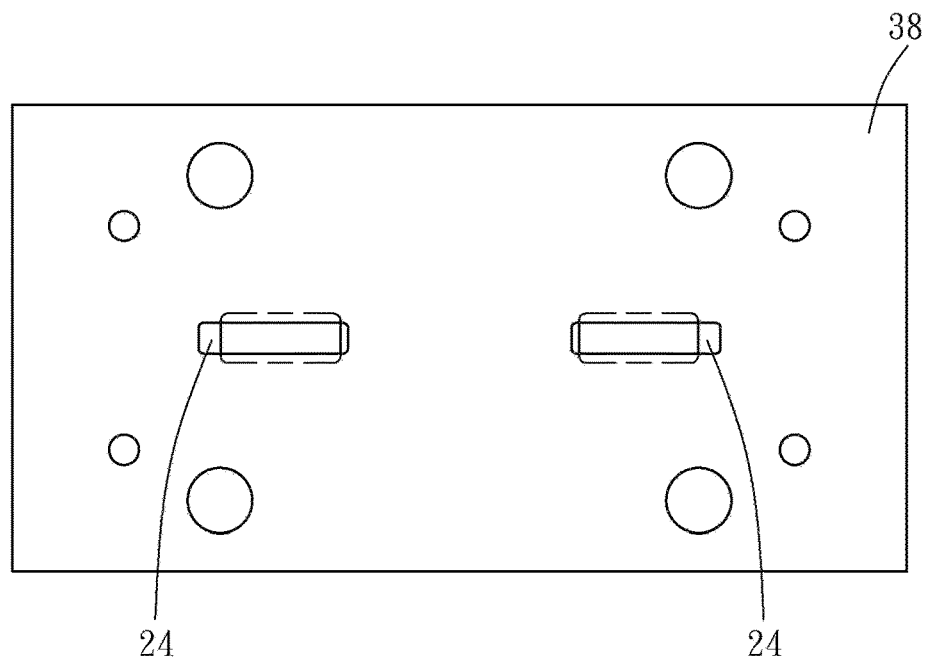
FIG. 8 is an end view of the fourth die block of the forming mold in accordance with the present invention.
Figure 9:
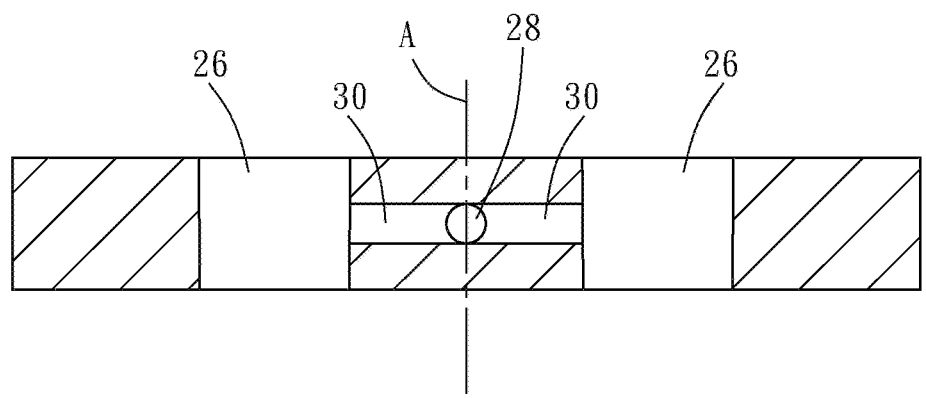
FIG. 9 is a top view of the fifth die block of the forming mold in accordance with the present invention.
Figure 10:
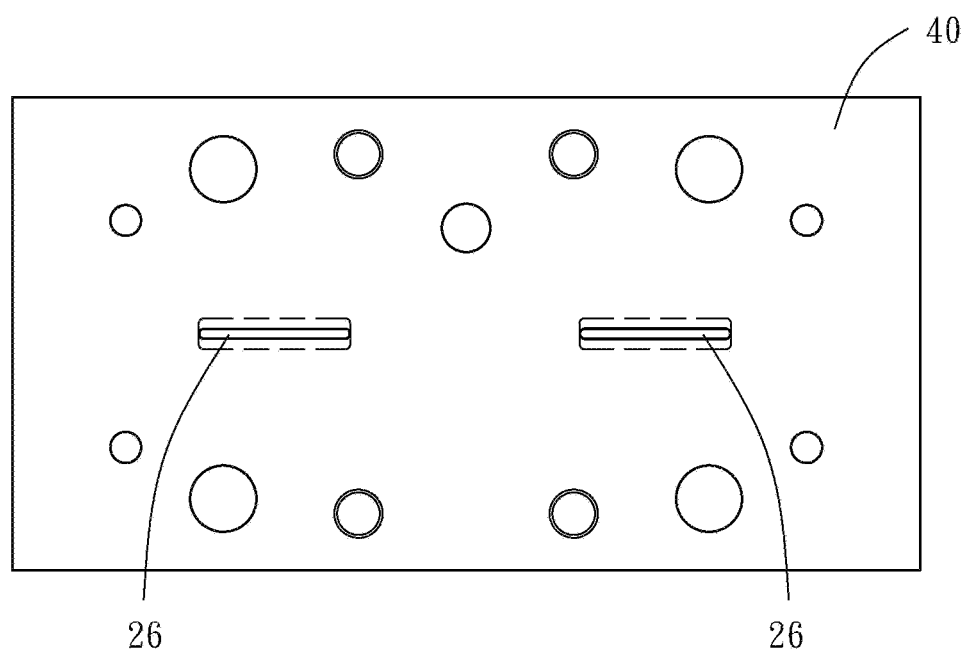
FIG. 10 is an end view of the fifth die block of the forming mold in accordance with the present invention.

As shown in FIG. 1 and FIG. 2, each main flow passage 16 has a front connection section 22, a middle connection section 24 and a rear connection section 26. One end of the front connection section 22 is connected to the inlet section 18, and the middle connection section 24 is connected between the front connection section 22 and the rear connection section 26. One end of the rear connection section 26 is connected to the outlet section 20. More specifically, as shown in FIG. 5 and FIG. 6, the cross section width of the two front connection sections 22 remains the same from beginning to end, and a second included angle θ2 is respectively defined between the extension direction of each of the two front connection sections 22 and the central axis A. The sum of the angles of the two second included angles θ2 ranges from 37 to 52 degrees (the minimum total is 37.8 degrees, and the maximum total angle is 51.3 degrees). As shown in FIG. 7 and FIG. 8, the cross section width of the two front connection sections 22 respectively gradually increases from the respective front connection sections 22 toward the respective rear connection sections 26. A third included angle θ3 is respectively defined between the extension direction of the inner wall of each of the two middle connection sections 24 and the central axis A. The sum of the angles of the two third included angles θ3 ranges from 7 to 12 degrees (the minimum total is 7.6 degrees, and the maximum total angle is 11.4 degrees). A fourth included angle θ4 is respectively defined between the extension direction of the outer wall of each of the two middle connection sections 24 and the central axis A. The sum of the angles of the two fourth included angles θ4 ranges from 22 to 34 degrees (the minimum total is 22.6 degrees, and the maximum total angle is 33.4 degrees). As shown in FIG. 9 and FIG. 10, the cross section width of the two rear connection sections 26 respectively gradually increases from the respective middle connection sections 24 toward the respective outlet sections 20.

On the other hand, the forming mold 10 of the present invention is composed of six die blocks, which are, sequentially from front to back, the first die block 32, the second die block 34, the third die block 36, the fourth die block 38, the fifth die block 40, and the sixth die block 42. In terms of length, the length L1 of the first die block 32 is 60 mm, the length L2 of the second die block 34 is 20~30 mm, the length L3 of the third die block 36 is 25~35 mm, the length L4 of the fourth die block 38 is 20~30 mm, the length L5 of the fifth die block 40 is 25~35 mm, and the length L6 of the sixth die block 42 is 35~40 mm. In addition to the configuration of the main flow passages 16, the inlet 12 is located at first die block 32, the inlet sections 18 are located at the first die block 32 and the second die block 34, the front connection sections 22 are located at the third die block 36, the middle connection sections 24 are located at the fourth die block 38, the rear connection sections 26 are located at the fifth die block 40, and the outlet sections 20 are located at the six die block 42. In addition, the forming mold 10 of the present invention further has a sub flow passage 28 and two branch flow passages 30. The sub flow passage 28 is located between the rear connection sections 26 of the two main flow passages 16 and extends straight down from the top surface of the fifth die block 40. One end of the two branch flow passages 30 communicates with the bottom end of the sub flow passage 28, and the other end of the two branch flow passages 30 communicates with the rear connection sections 26 of the two main flow passages 16 in a one-to-one manner.

In use, the polyvinyl chloride foam material with a specific gravity of 1.55~1.750 and high foaming characteristics is injected into the inlet 12, and then the polyvinyl chloride foam material flows from the inlet 12 to the two main flow passages 16. Then, in the process of flowing through two main flow passages 16, on the one hand, the longitudinal cross-sectional width of the two main flow passages 16 gradually decreases from the inlet 12 toward the outlets 14, and on the other hand, the width and angle of the two main flow passages 16 are changed in the cross section, and thus, the polyvinyl chloride foam material is gradually squeezed, and the product shape is formed when the polyvinyl chloride foam material is finally discharged by two outlets 14. As for the size of the product is 50 mm±0.05 mm (width)×2.8 mm±0.03 mm (thickness), the weight is 24 g±0.5 g per inch, and the surface hardness is more than 85A Shore. In addition, in the process of the polyvinyl chloride foam material flowing through the two main flow passages 16, a skin material (such as PVC, ABS, ASA, etc.) with a specific gravity of 1.450 to 1.650 and high strength and low foaming characteristics is injected into the sub flow passage 28, so that the skin material flows from the sub flow passage 28 through the two branch flow passages 30 to the rear connection sections 26 of the two main flow passages 16 respectively, and the skin material is then mixed with the polyvinyl chloride foam material passing therethrough to form the skin layer of the product.

In conclusion, the forming mold 10 of the present invention uses a one-in two-out design and is matched with the symmetrical configuration and special angle design of the two main flow passages 16 to allow the PVC foam material to pass through quickly and stably so as to form the shape of the product and to make the manufactured product have the characteristics of light weight, good hardness, strong rigidity and stable quality.

What is claimed is:

1. A forming mold for making polyvinyl chloride foamed wood-like slats, comprising an inlet, two outlets and two main flow passages, said main flow passages being symmetrically arranged with respect to a central axis, said two main flow passages each comprising an inlet section and an outlet section, said inlet sections of said two main flow passages each having one end thereof commonly connected to said inlet, an extension direction of said inlet section of each of said two main flow passages respectively defining with said central axis a first included angle therebetween, the sum of the angles of the two said first included angles ranging from 45 to 52 degrees, said outlet section of each of said main flow passage having one end thereof connected to one respective said outlet, a longitudinal cross-sectional width of said two main flow passages gradually decreasing from said inlet toward said outlets, wherein a cross section width of said middle connection section of each of said two main flow passages gradually increases from the associating said front connection section to the associating said rear connection section, and wherein a third included angle is respectively defined between an extension direction of an inner wall of each of said two middle connection sections and said central axis, and the sum of the angles of said two third included angles ranges from 7 to 12 degrees; a fourth included angle is respectively defined between an extension direction of an outer wall of each of said two middle connection sections and said central axis, and the sum of the angles of said two fourth included angles ranges from 22 to 34 degrees.

2. The forming mold for making polyvinyl chloride foamed wood-like slats as claimed in claim 1, wherein a cross section width of said inlet section of each of said two main flow passages remains the same from beginning to end.

3. The forming mold for making polyvinyl chloride foamed wood-like slats as claimed in claim 1, wherein a cross section width of said outlet section of each of said two main flow passages remains the same from beginning to end, and an extending direction of said outlet section of each of said two main flow passages is parallel to said central axis.

4. The forming mold for making polyvinyl chloride foamed wood-like slats as claimed in claim 1, wherein said two main flow passages each comprise a front connection section, a middle connection section and a rear connection section, said front connection section having one end thereof connected to the associating said inlet section, said middle connection section being connected between said front connection section and said rear connection section, said rear connection section having one end thereof connected to the associating said outlet section.

5. The forming mold for making polyvinyl chloride foamed wood-like slats as claimed in claim 4, wherein a cross section width of said front connection section of each of said two main flow passages remains the same from beginning to end.

6. The forming mold for making polyvinyl chloride foamed wood-like slats as claimed in claim 5, wherein an extension direction of each of said two front connection sections respectively defines with said central axis a second included angle therebetween, and the sum of the angles of said two second included angles ranges from 37 to 52 degrees.

7. The forming mold for making polyvinyl chloride foamed wood-like slats as claimed in claim 4, wherein a cross section width of said rear connection section of each of said two main flow passages gradually increases from the associating said middle connection section to the associating said outlet section.

8. The forming mold for making polyvinyl chloride foamed wood-like slats as claimed in claim 4, further comprising a sub flow passage and two branch flow passages, said sub flow passage being located between said rear connection sections of said two main flow passages and extending straight down from a top surface of said forming mold, said two branch flow passages each having one end thereof respectively communicating with said rear connection sections of said two main flow passages and an opposite end thereof commonly communicating with a bottom end of said sub flow passage.

9. The forming mold for making polyvinyl chloride foamed wood-like slats as claimed in claim 8, wherein said inlet is located at a first die block of said forming mold, said inlet sections are located at said first die block and a second die block of said forming mold that is connected to said first die block, said front connection sections are located at a third die block of said forming mold that is connected to said second die block, said middle connection sections are located at a fourth die block of said forming mold that is connected to said third die block, said rear connection sections, said sub flow passage and said branch flow passages are located at a fifth die block of said forming mold that is connected to said fourth die block, and said outlet sections are located at a sixth die block of said forming mold that is connected to said fifth die block.

10. The forming mold for making polyvinyl chloride foamed wood-like slats as claimed in claim 4, wherein said inlet is located at a first die block of said forming mold, said inlet sections are located at said first die block and a second die block of said forming mold that is connected to said first die block, said front connection sections are located at a third die block of said forming mold that is connected to said second die block, said middle connection sections are located at a fourth die block of said forming mold that is connected to said third die block, said rear connection sections are located at a fifth die block of said forming mold that is connected to said fourth die block, and said outlet sections are located at a sixth die block of said forming mold that is connected to said fifth die block.

\* \* \* \* \*